United States Patent [19]

DeMarco et al.

[11] 4,456,583
[45] Jun. 26, 1984

[54] PREPARATION OF SIMPLE NITRONIUM SALTS

[75] Inventors: Ronald A. DeMarco, Fairfax, Va.; Michael J. Moran, E. Norriton, Pa.

[73] Assignee: The United States of America as represented by the Secretary of the Navy, Washington, D.C.

[21] Appl. No.: 508,774

[22] Filed: Jun. 29, 1983

[51] Int. Cl.$^3$ .................. C01B 21/52; C01B 25/10; C01B 33/20

[52] U.S. Cl. .................. 423/277; 423/301; 423/386

[58] Field of Search .................. 423/277, 301, 386

[56] References Cited

U.S. PATENT DOCUMENTS

| | | | |
|---|---|---|---|
| 2,829,029 | 4/1958 | Bachman et al. | 423/277 |
| 3,061,404 | 10/1962 | Bachman et al. | 423/277 |
| 3,092,459 | 6/1963 | Cleaver | 423/386 |
| 3,323,866 | 6/1967 | Fox et al. | 423/277 |
| 3,375,083 | 3/1968 | Kuhn | 423/301 |
| 3,394,998 | 7/1968 | Fox et al. | 423/386 |
| 3,403,987 | 10/1968 | Kuhn | 423/386 |
| 3,431,087 | 3/1969 | Kuhn | 423/301 |
| 3,892,839 | 7/1975 | Adcock et al. | 423/386 |

OTHER PUBLICATIONS

Herzog et al., "Reaction of Boron Trifluoride with Dinitrogen Pentoxide & a New Nitryl Salt (NO$_2$)$_2$ [(BF$_3$)$_2$O]," C. R. Acad. Sc. Paris, t.280 (27 janvier 1975), Série C–197 to 200.

*Primary Examiner*—John Doll
*Assistant Examiner*—Wayne A. Langel
*Attorney, Agent, or Firm*—Robert F. Beers; William T. Ellis; Barry A. Edelberg

[57] ABSTRACT

Simple nitronium salts are formed by adding nitrogen dioxide, a simple nitronium salt former, and fluorine gas to a vessel held at a low temperature, and allowing the vessel to warm until a reaction occurs.

9 Claims, No Drawings

PREPARATION OF SIMPLE NITRONIUM SALTS

FIELD OF THE INVENTION

This invention relates generally to nitronium salts and more particularly to a new method for the preparation of simple nitronium salts.

BACKGROUND OF THE INVENTION

The existence and characteristics of simple nitronium salts such as nitronium hexafluoroarsenate, nitronium hexafluorophosphate and nitronium tetrafluoroborate have been known for some time. For example, nitronium hexafluoroarsenate is a colorless, crystalline solid that is stable at room temperature and sensitive to moisture. The salt is soluble in nitromethane and, like other nitronium salts, is an excellent nitrating agent for aromatics and a good oxidizing and intercalating agent for covalent materials such as graphite and polyacetylene.

The recent interest in nitronimum hexafluoroarsenate, ($NO_2AsF_6$) as an oxidizing agent has emphasized the need for a simple, one-step, high yield synthesis of this compound. Previous syntheses have involved the initial preparation of nitryl fluoride ($FNO_2$) (from $NO_2$ and $F_2$) and subsequent reaction with arsenic pentafluoride ($AsF_5$); the use of hydrogen fluoride (HF) with nitric acid ($HNO_3$), nitryl chloride ($ClNO_2$) or nitrate esters; the reaction of nitrogen dioxide ($NO_2$), bromine trifluoride ($BrF_3$), and arsenic pentoxide ($As_2O_5$); the use of fluorine nitrate ($FNO_3$); or metathesis reactions from other $AsF_6^-$ salts. These reactions generally were run in metal cylinders or quartz vessels and were multistep.

In all cases, the process is made more expensive and chemically complicated by the fact that the reagents are incompatable with Pyrex TM glass. $NO_2F$ and HF cannot be made to contact Pyrex TM glass because silicon tetrafluoride ($SiF_4$), which would contaminate the product, is also generated. The reagents in this new process, are compatible with dry Pyrex TM glass under the reaction conditions, and no $SiF_4$, or $SiF_6^{2-}$ salts contaminate the product.

OBJECTS OF THE INVENTION

It is therefore an object of this invention to provide a new and novel process for the preparation of simple nitronium salts.

Another object is to provide a single-step process for the preparation of simple nitronium salts.

A further object of this invention is to provide a process for the preparation of simple nitronium salts which may be carried out in a glass vessel.

Yet another object of this invention is to provide a single step process for the preparation of nitronium hexafluoroarsenate which may be carried out in a glass vessel.

A still further object of this invention is to provide a process for the preparation of intercalants for covalent materials.

SUMMARY OF THE INVENTION

These and other objects are achieved by reacting nitrogen dioxide, a simple nitronium salt former, and fluorine gas to yield a simple nitronium salt. Equimolar amounts of nitrogen dioxide and the simple nitronium salt former are condensed into a vessel. An at least stoichiometric amount of fluorine gas is admitted into the vessel and the vessel allowed to warm until a reaction occurs to form a simple nitronium salt. The nitronium salt is then separated.

DESCRIPTION OF THE PREFERRED EMBODIMENTS

To carry out the process of this invention, nitrogen dioxide is condensed into a vessel. Typically, this vessel is immersed in liquid nitrogen so that the vessel is at a temperature of about $-196°$ C. An essentially equimolar amount of a simple nitronium salt former is also condensed into the vessel. In this description and the claims that follow, the term "simple nitronium salt former" refers to a compound of the formula $MF_n$, wherein M is selected from the group consisting of arsenic, boron, and phosphorus, and n is an integer equal to the maximum valence state of the substance M. An at least stoichiometric amount of fluorine gas and preferably a stoichiometric excess is admitted into the vessel. The vessel and its contents are allowed to warm to room temperature behind a shield, whereupon a reaction occurs during this warming to form the simple nitronium salt of the salt former, which appears as a solid. The excess fluorine is then removed. The vessel is then typically taken into a Dry Box containing a dry oxygen-free (<5 ppm) inert gas, typically argon, and the product isolated and removed from the vessel.

For the sake of simplicity and economy, the process is best carried out using a dry reaction vessel made of Pyrex TM glass. The vacuum system used as well as the Pyrex TM vessel should be pretreated to accomodate the handling of fluorine gas. The Pyrex TM vessel is typically pretreated by admitting fluorine gas into the dry vessel, exposing the vessel to bright sunlight for about one hour, then removing the fluorine. As implied above, any equipment used for handling either the reactants or the product should be as dry as possible.

In this description and the claims that follow, the term simple nitronium salt refers to a compound having the formula $NO_2MF_y$ wherein M has the meaning stated above and y is an integer equal to $n+1$. Attempts at forming the complex salt $(NO_2)_2SiF_6$ resulted in an impure product. Although the process described herein has been applied as yet only to the formation of nitronium hexafluoroarsenate ($NO_2AsF_6$), it is believed that the process is widely applicable to simple nitronium salts analagous to $NO_2AsF_6$.

It is imperative that essentially equimolar amounts of the simple nitronium salt former and nitrogen dioxide be employed. An excess of one or the other could lead to side reactions and a resultant contamination of the final product.

Further, it is desirable that an excess of fluorine gas be employed to ensure that the reaction, $NO_2 + MF_n + \frac{1}{2}F_2 \rightarrow NO_2MF_y$, continues to completion. Preferably, the excess should be about 10 molar percent over the stoichiometric amount and most preferably an at least equimolar amount of fluorine gas is added. A large excess over the equimolar amount of fluorine gas would be wasteful but not harmful to the process.

In addition, the nitrogen dioxide reagent should be carefully purified to remove essentially all traces of nitrogen oxide (NO). Traces of NO may form side products, most likely FNO, that may contaminate the product.

It should also be noted that the reaction which forms the product is highly exothermic. Therefore, extreme caution should be used to avoid an explosion, especially if greater than 6 mmol of the product are to be made.

EXAMPLES

Having described the invention in general, the following examples are being given to illustrate the principles of the invention and are not intended to limit the scope of the invention in any manner.

EXAMPLE 1

(nitronium hexafluoroarsenate)

Fluorine was pretreated to remove hydrogen fluoride and silicon fluoride ($SiF_4$) impurities and was handled in a passivated copper vacuum line designed for fluorine use.

Arsenic pentafluoride and $NO_2$ were carefully purified by trap-to-trap fractional condensation on a standard Pyrex TM vacuum line ($10^{-6}$ mm Hg) equipped with Teflon TM glass valves. To purify the $AsF_5$, the less volatile impurities (HF and arsenic trifluoride ($AsF_3$)) were condensed at $-95°$ C. (toluene slush-cooled with liquid nitrogen); the $AsF_5$ was condensed at $-126°$ C. (methylcyclohexane slush-cooled with liquid nitrogen), and the more volatile $SiF_4$ was condensed at $-196°$ C. The $NO_2$ was purified by collecting the $NO_2$ in a $-78°$ C. bath (acetone-Dry Ice TM) and passing the more volatile NO into a $-196°$ C. bath. The trap-to-trap distillations were repeated 3 times in each case.

A Pyrex TM reaction vessel with a volume of approximately 390 ml was constructed from a 350 ml Pyrex TM round-bottom flask to which a 29/42 standard taper male joint was connected to the neck, and a Teflon TM/glass stopcock, which had a 29/42 standard taper female joint, attached. The standard taper joints were lubricated with Fluorolube TM grease. The vessel was attached to the glass vacuum line using Swagelok TM connectors, evacuated under high vacuum, and dried under dynamic vacuum by heating with a flame from a torch. When the vessel cooled, the valve was closed and the vessel was transferred to the copper line and connected with Swagelok TM connectors. The interspace was evacuated and approximately 100 Torr of $F_2$ was added to the vessel to passivate the surface, then the stopcock was closed. The vessel was removed from the vacuum line and placed in the sunlight for approximately 1 hour. The vessel was reattached to the copper vacuum line and the interspace evacuated. The $F_2$ was removed, and the stopcock closed.

The vessel was taken from the copper line and attached to the glass vacuum line with Swagelok TM connectors. The interspace was evacuated and the base of the vessel was cooled to $-196°$ C. The stopcock valve was opened and the $NO_2$ and $AsF_5$ were added in layers. First, the $NO_2$ (5.84 mmol) was slowly condensed onto the bottom of the vessel, followed by the $AsF_5$ (5.84 mmol). The reaction vessel stopcock was closed and the vessel, while being maintained at $-196°$ C., was removed from the glass line and reconnected to the copper line. The interspace was evacuated and the entire bulb of the vessel was cooled to $-196°$ C. Excess $F_2$ (6.0 mmol) was slowly and carefully admitted into the vessel. While maintaining the temperature of the vessel at $-196°$ C., the stopcock on the vessel was closed and the vessel removed from the copper line. The liquid nitrogen coolant was discarded and a cold Dewar flask placed around the reaction vessel. The Dewar flask and the vessel were then placed behind a shield and allowed to slowly warm to ambient temperature by placing towels around the neck of the Dewar flask. As the flask warmed to room temperature ($\sim 2$ hr) a copious amount of white solid formed. The vessel was attached to the copper line, the interspace was evacuated; and the excess $F_2$ and unreacted reagents were removed under dynamic vacuum. After pumping for approximately 15 minutes, the stopcock valve was closed and the vessel was disconnected from the vacuum line and transferred into a dry box. The stopcock on the vessel was opened; the standard taper joints disconnected and the grease removed from the standard taper joint. Approximately 1.01 g (75% yield) of product was scraped into a tared Kel-F TM vessel equipped with a stainless steel Swagelok TM cap and Teflon TM ferrules. The product was identified and its purity determined by infrared spectra (Nujol TM and Fluorolube TM mulls), Raman spectrum and Debye-Scherrer X-ray powder pattern (no extraneous peaks observed).

EXAMPLE 2

(nitronium hexafluorophosphate)

The process of example 1 is carried out substituting phosphorus pentafluoride ($PF_5$) for arsenic pentafluoride.

EXAMPLE 3

(nitronium tetrafluoroborate)

The process is carried out as in example 1, substituting boron trifluoride ($BF_3$) for arsenic pentafluoride.

Obviously, many modifications and variations are possible in the light of the above teachings. It is therefore to be understood that, within the scope of the appended claims, the invention may be practiced otherwise than as specifically described.

What is claimed and desired to be secured by Letters Patent of the United States is:

1. A process for the preparation of a simple nitronium salt, the steps of which comprise:
    selecting a simple nitronium salt former having the formula $MF_n$, wherein M is selected from the group consisting of arsenic, boron, and phosphorus, and n is an integer equal to the maximum valence state of the substance M;
    condensing nitrogen dioxide into a vessel;
    condensing an essentially equimolar amount of said simple nitronium salt former in said vessel on top of said condensed nitrogen dioxide;
    admitting an at least stoichiometric amount of fluorine gas into said vessel;
    allowing said vessel and its contents to warm until the reaction $NO_2 + MF_n + \frac{1}{2}F_2 \rightarrow NO_2MF_y$, wherein y is an integer equal to $n+1$, occurs to form said simple nitronium salt;
    isolating said nitronium salt.

2. The process of claim 1 wherein said vessel comprises glass.

3. The process of claim 1 further comprising the step of carrying out said condensing and admitting step at or below about $-196°$ C.

4. The process of claim 1 comprising selecting said simple nitronium salt former from the group consisting of arsenic pentafluoride, and phosphorus pentafluoride.

5. The process of claim 4 wherein said simple nitronium salt former consists of arsenic pentafluoride.

6. The process of claim 5 further comprising the step of selecting said vessel to comprise glass.

7. The process of claim 6 wherein said admitting step comprises admitting an amount of fluorine gas into said vessel which is in excess of about 10% of the stoichiometric amount.

8. The process of claim 7 wherein said admitting step comprises admitting an at least equimolar amount of fluorine gas into said vessel.

9. A process for the preparation of nitronium hexafluoroarsenate, the steps of which comprise:

condensing nitrogen dioxide into a glass vessel held at or below about $-196°$ C.;

condensing, at or below about $-196°$ C., an essentially equimolar amount of nitronium hexafluoroarsenate on top of said condensed nitrogen dioxide;

admitting an at least equimolar amount of fluorine gas into said vessel at or below about $-196°$ C.;

allowing said vessel and its contents to warm until a reaction occurs to form nitronium hexafluoroarsenate;

isolating said nitronium hexafluoroarsenate.

* * * * *